United States Patent [19]

Bartholomew

[11] 4,091,536
[45] May 30, 1978

[54] ROTARY CUTTING DEVICE

[76] Inventor: Mark R. Bartholomew, 8641 Willis #32, Panorama City, Calif. 91402

[21] Appl. No.: 757,997

[22] Filed: Jan. 10, 1977

[51] Int. Cl.[2] .......................... A01D 35/26; A01G 3/06
[52] U.S. Cl. ........................................ 30/276; 56/12.7
[58] Field of Search ................... 30/276, 347; 56/12.7, 56/295, 255; 74/573; 51/335

[56] References Cited

U.S. PATENT DOCUMENTS

| 2,709,323 | 5/1955 | Swan | 51/335 |
|---|---|---|---|
| 3,664,102 | 5/1972 | Reber | 56/295 |
| 3,733,923 | 5/1973 | Goodrich | 74/573 |
| 3,826,068 | 7/1974 | Ballas et al. | 56/295 |
| 3,928,911 | 12/1975 | Pittinger | 30/276 |

Primary Examiner—Jimmy C. Peters
Attorney, Agent, or Firm—Romney, Schaap, Golant, Scillieri, Disner & Ashen

[57] ABSTRACT

A rotary cutting device primarily used for the cutting of vegetation and which includes an outer housing having a motor mounted within the housing. A bobbin assembly which stores a selected amount of a filament permits dispensing of the filament through a hollow drive shaft which is rotated by the motor. The lower end of the filament serves as a rotating cutting element. The bobbin assembly is capable of being shifted axially with respect to the drive shaft in order to dispense a selected amount of the filament when shifted to a lower position and which also prevents locking action of the filament against unauthorized withdrawal when the bobbin assembly is normally biased to its upper position. The rotary cutting device also includes an outwardly flaring lower skirt section which is provided with a recess having a balancing element such as a liquid or semi-liquid material contained therein for balance against both static and dynamic imbalance created by the rotary action.

9 Claims, 6 Drawing Figures

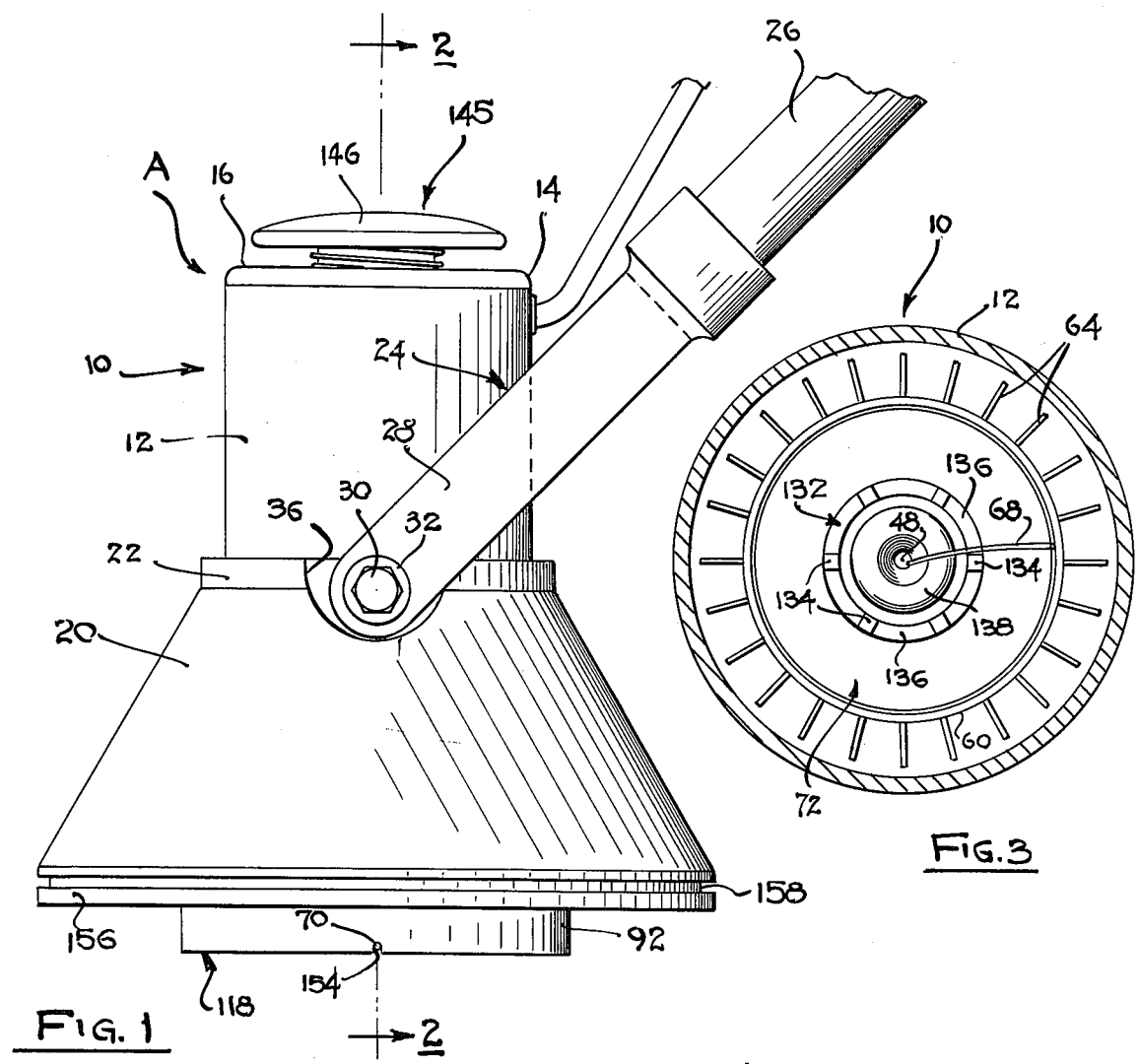
Fig. 1
Fig. 3
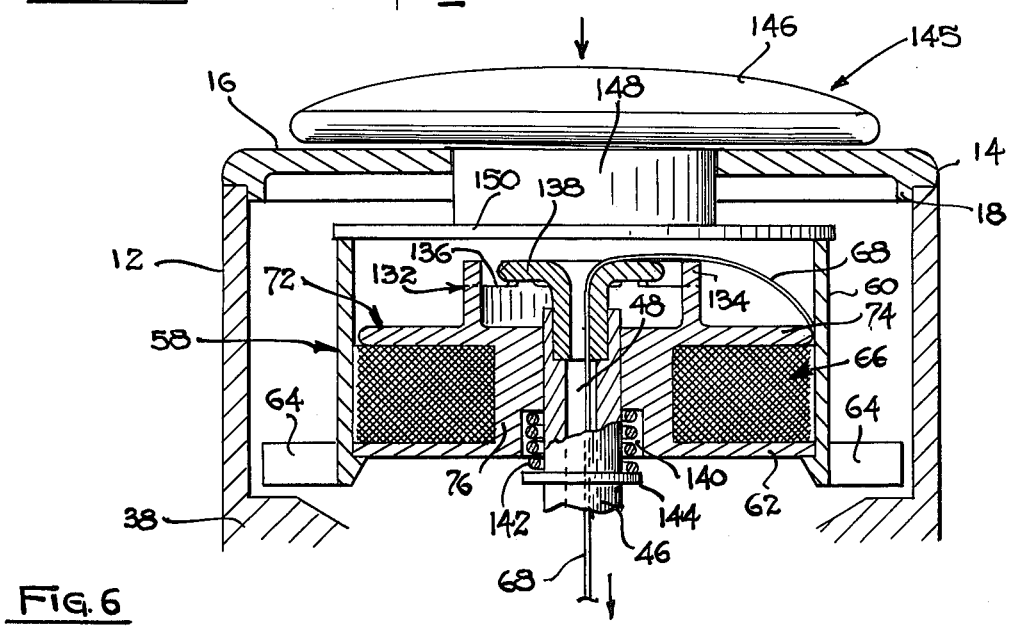
Fig. 6

ROTARY CUTTING DEVICE

BACKGROUND OF THE INVENTION

1. Purpose of the Invention

This invention relates in general to certain new and useful improvements in rotary cutting devices and, more particularly, to vegetation cutting devices which employ a flexible rotating cutting element.

2. Prior Description of the Prior Art

There have been many prior art attempts to provide for a safe and efficient rotary head for rotary lawn mowers, edgers, trimmers and the like, which perform in a safe and efficient manner. In the large majority of these prior art lawn mowers, edgers and the like, the rotary or cutting element comprises a rotating metal blade or similar cutting element which is rotated at a high rate of speed to effect the cutting of grass, weeds or similar vegetation. Nevertheless, even when the device is provided with a shield around the cutting element, hazardous conditions are not completely obviated since it is possible for the user of the device to contact the high speed rotating cutting element. Moreover, these high speed rotating cutting elements may oftentimes strike rocks or similar objects in their pathway and thereby propel these objects creating a hazardous condition to property and individuals in the proximate area.

There have been various attempts to overcome these hazardous conditions which are created by the rigid type metal cutting blades in the prior art cutting assemblies. Most of these attempts to overcome the problems of the type described involve the utilization of some type of flexible flail or cord type cutting element which will have sufficient resiliency so as to overcome the problem of propelling objects which are struck by the high speed rotating cutting element. Nevertheless, these resilient type cutting elements suffer a disadvantage in that they are not safe to the operator of the device and, even more so, the mere resiliency is not sufficient to ensure that the dangerous conditions will not be created when rotation is effected at the desired cutting speeds.

Notwithstanding the above, the foregoing prior art cutting devices are so constructed that they are generally not provided with means for easy replaceability of the cutting elements in the event of wear and damage. Consequently, it is usually expensive and rather time consuming in order to replace the cutting element in these various prior art devices.

In view of the foregoing problems, there have been many proposed prior art vegetation cutting devices such as lawn mowers or trimming devices which employ a disc-like head member arranged to be rotated by an electric motor. The disc-like member contains a spool which is located within the housing in coaxially aligned relationship to the shaft of the motor. A length of flexible, non-metallic line is coiled about the spool so that its free travelling end extends generally peripherally from the spool to the lower end of the device. In this way, the free travelling end will be swung arcuately at a high speed through the actuation of the motor in order to cut adjacent vegetation in the manner of a flail.

Devices of this type have revealed that under ideal operating conditions they will trim grass or other lightweight vegetation with reasonable effectiveness. Moreover, these devices possess a significant advantage in that they are much safer to use than the more conventional cutter in that they do not discharge stones or similar objected in the manner of missiles. In this way, the devices which employ flexible cords thereby obviate the problem of stone-like missiles striking persons or property in the working area. This latter type of prior art device which employs a rotary cord-like element is also subject to certain disadvantages which similarly limit, if not destroy, its practical value. Devices of this type are effective to cut standing, lightweight vegetation, but are almost completely ineffective in other tasks, such as the cutting of heavy dense growths of vegetation. Moreover, these devices are generally only effective when cutting upright vegetation, but are not effective in cutting vegetation in a rank condition. Moreover, the cords in these prior art devices experience a breakage rate which is significantly high to effectively nullify their advantages and thereby render devices which are in many cases commercially ineffective.

Another one of the principal disadvantages of these prior art devices is that the cord, typically in the form of a filament, is not designed to replace the worn or broken cord during operation of the cutting device. Moreover, in these prior art devices, there is no provision for providing for the balance of the cord as contained upon a spool within the cutting device. In addition to the foregoing, the prior art devices contain no means to offset the tendency of the unit to be imbalanced when the cutting cord is extended to any length.

OBJECTS OF THE INVENTION

It is, therefore, the primary object of the present invention to provide a rotary cutting device which utilizes a unique bobbin structure in order to provide a desired amount of a flexible rotary cutting filament upon deterioration or wear.

It is another object of the present invention to provide a rotary cutting device of the type stated which obviates the problems of flailing hard objects through a rigid rotating cutting element.

It is a further object of the present invention to provide a rotary cutting device of the type stated which provides for efficient and desired feed of the rotating cutting element from the spool upon wear and deterioration of the cutting element.

It is an additional object of the present invention to provide a method of dispensing a rotating cutting flexible filament on a highly sufficient basis as a result of wear and deterioration of the free edge of the cutting element.

With the above and other objects in view, my invention resides in the novel features of form, construction, arrangement and combination of parts presently described and pointed out in the claims.

SUMMARY OF THE DISCLOSURE

The present invention relates in general to a rotary cutting device and particularly, a rotary cutting device of the type capable of cutting vegetation through a rotary filament cutting element.

The device to the present invention comprises an outer housing with a suitable motor mounted in the housing and which may adopt the form of an electric motor, hydrocarbon combustion engine or the like. The motor is mounted in the housing and is provided with a drive shaft having an extending upwardly portion and a downwardly extending portion. The lower end of the motor is provided with a disc mounting ring for retaining a filament guide disc. At the upper end of the drive shaft, a bobbin assembly is mounted and carries a source of the filament or the like. The filament is dispensed from the source through the drive shaft which is hollow and through the lower end thereof. The lower end of the filament extends beyond the housing and serves as the cutting element.

A pushbutton switch mechanism is mounted on the upper end of the housing and is providing with a member which engages the bobbin assembly. Thus, when the pushbutton switch is shifted downwardly, the entire bobbin assembly is pushed downwardly against the action of a compression spring. As this occurs, the filament is released from a groove which is formed by a pair of upstanding fingers. In this way, an additional amount of the filament cord can be pulled from the source contained within the bobbin assembly and used as a new lower cutting element. This action is particularly performed where the initial lower end of the cord is worn or frayed to the extent where it is no longer capable of functioning as a cutting element.

Upon release of the pushbutton switch, the bobbin assembly is automatically shifted upwardly where the filament is then engaged between a pair of locking fingers so that further unauthorized withdrawal thereof is prevented.

The present invention also provides a unique means for balancing the housing from both static and dynamic imbalance during the rotation of the moving rotating parts. In this case, a skirt section connected to the housing is provided with an outwardly flaring portion and with a recess formed therein. A weighted substance is located in this recess to provide for the balancing of the device and to overcome any imbalance created by the rotary action.

BRIEF DESCRIPTION OF THE DRAWINGS

Figure 2:
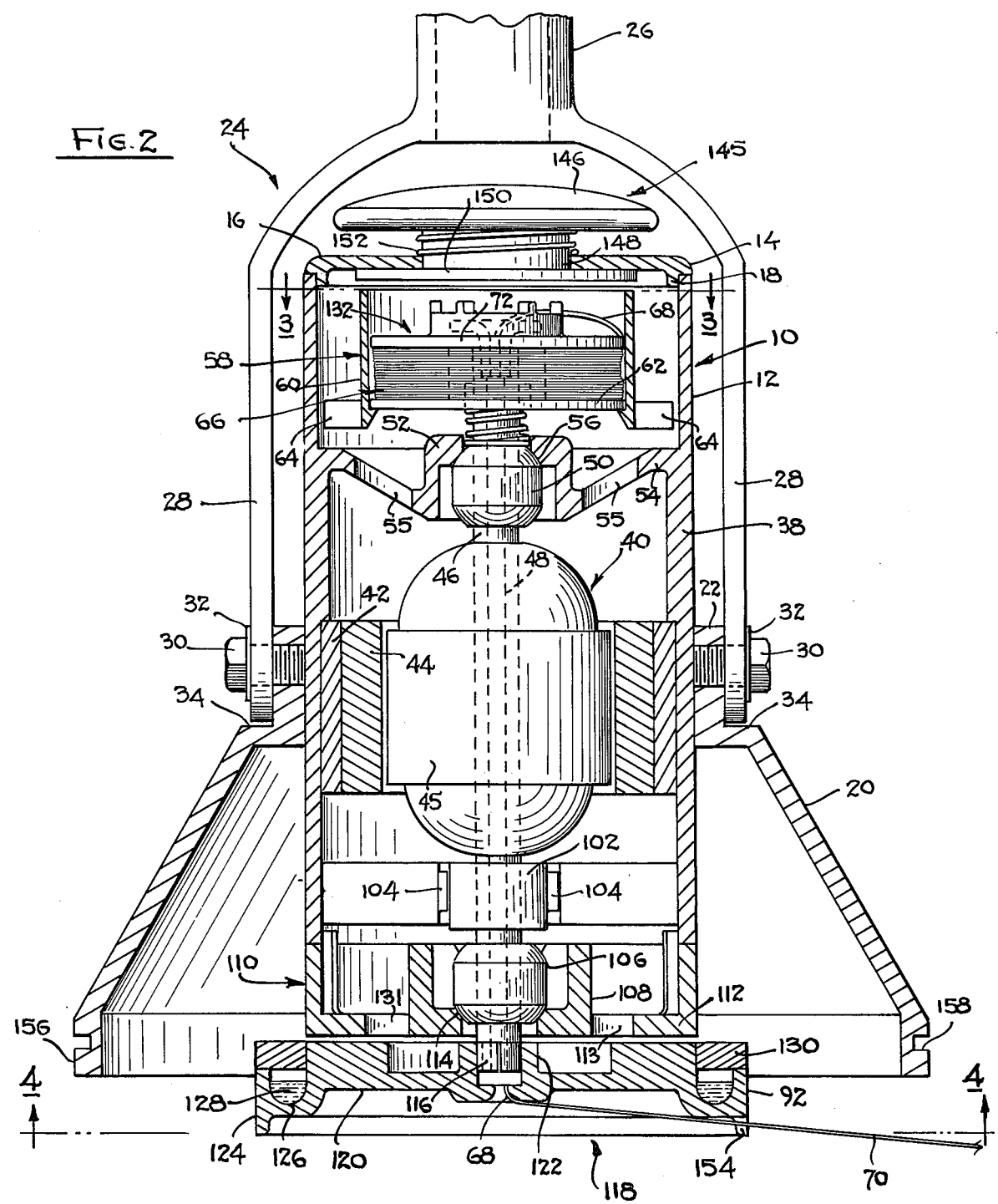
Figure 4:
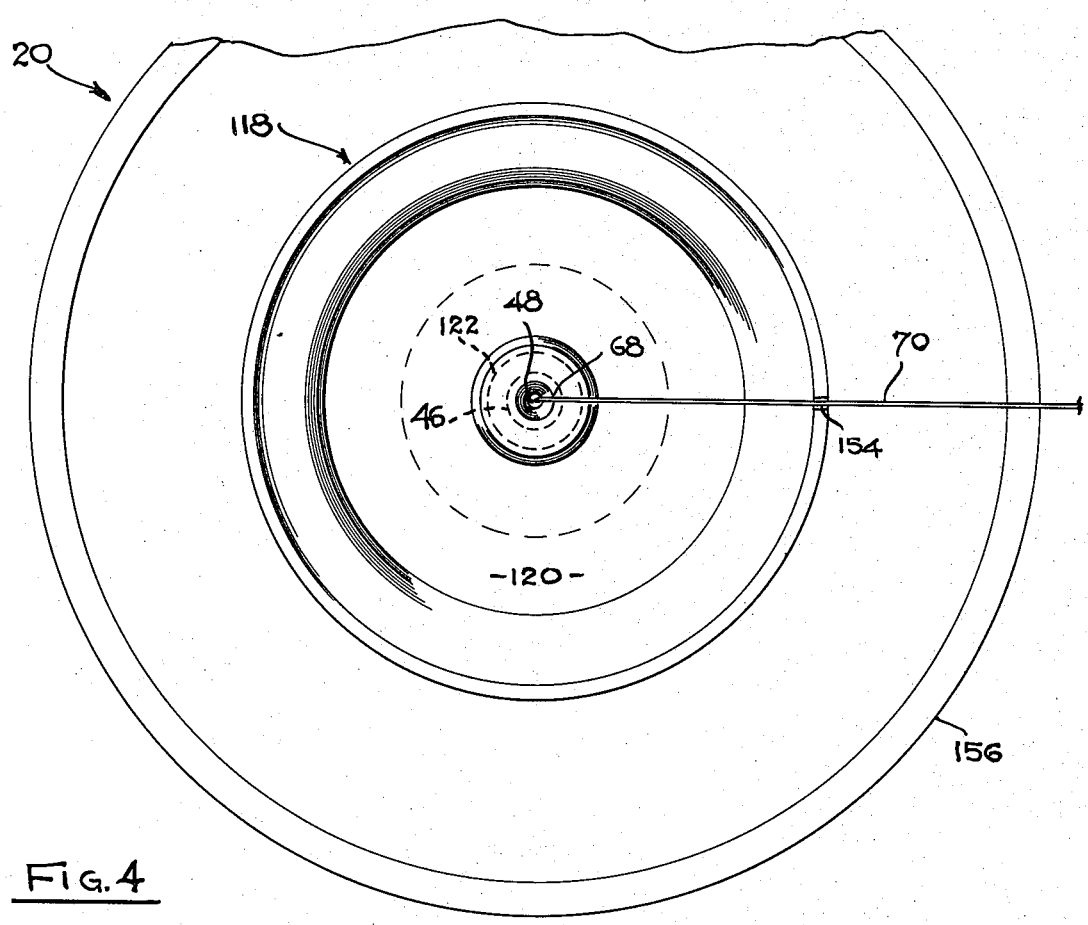
Figure 5:
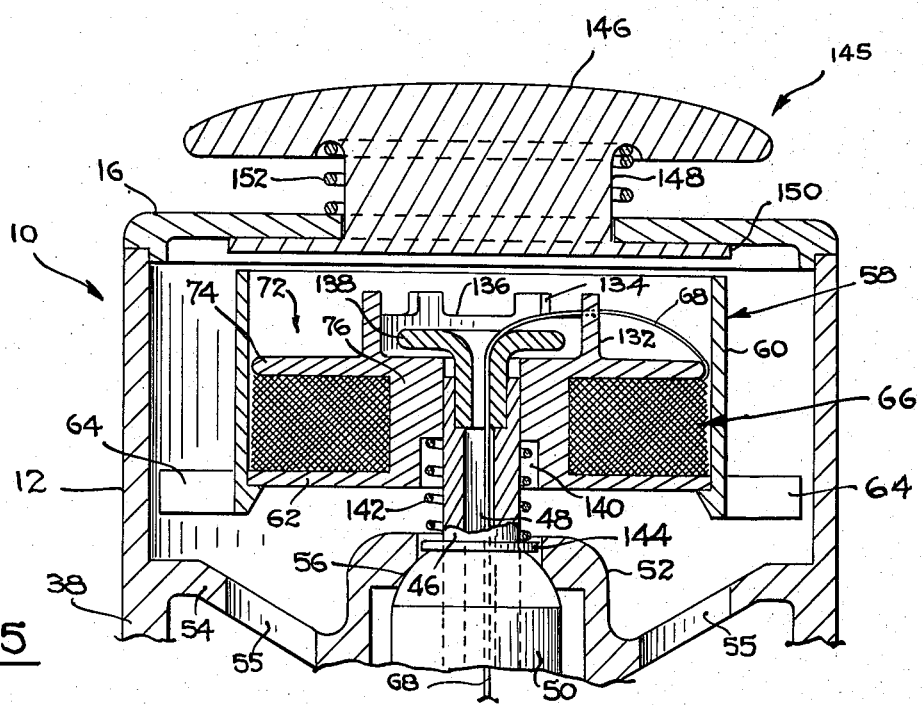

Having thus described the invention in general terms, references will now be made to the accompanying drawings in which:

FIG. 1 is a side elevational view, partially broken away, and showing a rotating cutting device constructed in accordance with and embodying the present invention;

FIG. 2 is a vertical sectional view, partially broken away, and taken along line 2—2 of FIG. 1;

FIG. 3 is a horizontal sectional view, taken along line 3—3 of FIG. 2, and showing a portion of a bobbin mechanism forming part of the device of the present invention;

FIG. 4 is a horizontal sectional view, partially broken away, and taken along line 4—4 of FIG. 2 and showing a portion of the underside of the device of FIG. 1;

FIG. 5 is a fragmentary vertical sectional view showing the bobbin mechanism of FIG. 3 with the release button in the unactuated position; and FIG. 6 is a fragmentary vertical sectional view, similar to FIG. 5, and showing the bobbin mechanism with the release button in the actuated position.

DETAILED DESCRIPTION

Referring now in more detail and by reference characters to the drawings which illustrate a practical embodiment of the present invention, A designates a rotary cutting device which is primarily useful in the cutting of grass, plant growth and similar vegetation. Thus, the device A is often referred to herein as a vegetation cutting device, although it can be used in other applications as well.

The rotary cutting device of the present invention is described herein in terms of a "lawn mower," that is a device which has a rotary cutting element closely located in disposition to vegetation in an upright position on a ground area. However, it can be observed that the device of the present invention may be used in a wide variety of applications such that it is capable of being used as a hedge trimmer, a vegetation edge trimmer and the like. As explained hereinafter and in more detail, various advantageous results of the cutting device of the present invention are obtained when the cutting device is used in other configurations, such that the cutting device is capable of cutting vegetation in any of a desired plurality of cutting planes. In any case, the cutting element is a flexible member which cuts vegetation in the manner of a flail.

The rotary cutting device A generally comprises an outer cylindrically shaped housing 10 which includes a relatively vertically disposed cylindrical side wall 12. This side wall 12 is provided at its upper end with a tapered rim 14 and a relatively flat horizontally disposed top wall 16. By reference to FIG. 2, it can be observed that the top wall 16 which is secured to the upper end of the cylindrically shaped side wall 12 by means of a downwardly depending cylindrically shaped retaining flange 18 which is sized and shaped to snuggly fit within the upper end of the cylindrically shaped side wall 12. However, any other form of attachment means could be employed in this respect.

Secured to the lower end of the outer housing 10 is a downwardly and outwardly tapering skirt 20 which is retained against the outer surface of the side wall 12 of the housing 10 by means of an annular retaining ring 22. The actual securement of the skirt 20 with respect to the housing 10 may be conventional in its construction. However, in the preferred embodiment of the present invention, it can be observed that the skirt 20 is provided at its upper end with a cylindrically shaped retaining ring 22 which bears against the cylindrical side wall 12 of the housing 10. By further reference to FIG. 2, it can be observed that the retaining ring 22 may be integral with or otherwise secured to the upper end of the skirt 20.

Pivotally secured to the retaining ring 22 is the clevised end 24 of a handle 26. The clevised end 24 includes a pair of arms 28, each being located on diametrally opposite sides of the housing 10, in a manner as illustrated in FIGS. 1 and 2 of the drawings. Moreover, the lower end of each of these arms is pivotally secured to the housing 10 by means of screws 30 which also extend through the retaining ring 22. In this respect, the screws 30 would have a threaded portion extended into the retaining ring 22 but which would permit the lower ends of the arms 28 to be pivotal thereon. Moreover, a washer 32 is disposed between the head of the screws 30 and the outer surface of the arms 28 in order to provide a form of bearing action. By further reference to FIG. 1, it can be observed that recessed portions 34 are formed in the skirt 20 in order to permit swingable movement of the handle 26.

The handle 26 including the clevised end 24 can be personally adjusted in order to suit the personal balance of the user of the device A. In addition, a similar device could be used in place of the handle mechanism as described herein which will also provide a radial and axial means of adjustment.

The housing 10, the skirt 20 and the handle 26, including the associated clevised end 24, as well as many of the other components of the rotary cutting device, hereinafter described, may be formed of any structural metal, such as steel, iron, aluminum or the like. Generally, the metal which is employed is one which will be easily fabricated to the desired shape consistent with the structural constraints required for the rotary cutting device. However, other materials may be employed in the construction of these components, as for example, plastics such as polyvinyl chloride, polystyrene, polystyrene-polybutadiene copolymers and the like.

These various components may also be formed of reinforced plastic materials which include reinforcing filaments such as glass, boron, carbon, grown whiskered crystals, and similar filaments contained in suitable thermoplastic or thermosetting resins. Some of the suitable thermoplastic resin materials which can be employed in a reinforced plastic component may be polypropylene, polycarbonates and the like. With regard to the thermosetting resins, phenolic and epoxy-type resins and the like may be used. The exact composition of the structure will be predicated upon the environment in which the device is to be used and the size and strength requirements and like factors.

The housing side wall 12 is provided with a relatively thick side wall section 38 for reinforcing purposes and located at the lower end of this relatively thick section 38 is an electrical motor 40. The motor 40 is comprised of an outer casing 42 and a field winding 44 which may be secured to the side wall 12. The motor 40 may adopt any form of desired construction inasmuch as it must be designed to be retained within the housing 10. In the embodiment as illustrated, the rotor 45 of the motor 40 would be located within the casing. The motor 40 is preferably of a magnetic type motor of conventional construction. In this respect, any form of electrical motor may be employed and may also be a DC operated or an AC operated electrical motor. For this purpose a conventional current carrying conductor 47 may be connected to the motor 40. Nevertheless, hydrocarbon combustion engines and the like could also be utilized in connection with the present invention.

The motor 40 is suitably located so that it presents a vertically disposed hollow drive shaft 46 having a central bore 48 extending therethrough. Secured to the upper end of the drive shaft 46 is a rotatable driving hub 50 which is secured to and rotates with the drive shaft 46. The driving hub 50 is located within a hub casing 52, the latter of which is provided with outwardly extending arms 54 integral with the upper end of the enlarged side wall section 38. The hub casing 52 is similarly provided with a tapered aperture 56 at its upper end which accommodates a tapered upper end of the hub 50 and in this respect serves as a bearing surface for the rotational movement of the hub 50. The tapered upper end of the hub 50 is actually part of a spherical section and the same holds true of the tapered aperture 56 so that the hub 50 serves as a sub aligning bearing.

Also located within the housing 10 is a bobbin sleeve 58 which includes an outer sleeve side wall 60 fixedly secured to a horizontally disposed bottom wall 62. At the lower end of the bobbin sleeve 58 are a plurality of circumferentially spaced, outwardly located, angularly extending fan blades 64 which are slightly spaced from the interior surface of the side wall 12 in the manner as illustrated in FIG. 2. The bobbin assembly 58 rotates with the drive shaft 46 in a manner to be hereinafter described in more detail. However, as the bobbin assembly rotates, it will rotate the fan blades 64 in order to force a cooling air over the motor. The air which acts as a colling medium may actually be introduced through an aperture formed in the top wall as hereinafter described. In like manner, the side wall 12 of the housing 10 may be provided with an aperture (not shown) located above the blades 64 for the intake of a cooling air. Further, arms 54 are provided with a plurality of air passage apertures 55, as illustrated in FIG. 2, in order to permit the inducted air to pass over the motor 40.

Suitably retained within the bobbin sleeve 58 is a coil 66 of filament type material. The filament 68 is illustrated as being dispensed from the coil 66 in FIG. 2 of the drawings, and which is provided with a lower end 70 to serve as a cutting element. The filament is retained by a cap or cover member 72 which is provided with a top retaining wall 74 and an interiorly located vertically disposed wall 76, the latter serving as an inner retaining wall or spool portion for the coil 66, as illustrated in FIGS. 5 and 6 of the drawings. In the preferred embodiment of the present invention, the vertical wall 76 and the bottom wall 62 and top wall 74 are all integral with each other, although any form of suitable construction may be employed.

The coil is formed of any suitable filament material, typically of the type used in reinforced plastic materials. Nevertheless, any suitable form of filament may be employed in the construction of the cutting element. Any of the filamentary materials described above may be employed as the filament used to form the cutting element. Thus, for example, glass fibers, boron fibers, carbon fibers and similar forms of metallic fibers may be used in the formation of the filamentary material. Typically, these fibers are axially aligned at least within about five degrees with respect to their axial length. Moreover, the filamentary materials may be connected by means of a suitable flexible binder material.

The filament 68 is preferably constructed with about a 0.1 inch diameter which provides excellent cutting power. Generally, in accordance with the prior art techniques, it was necessary to construct the cable with a substantially lesser diameter, as for example, filaments that are no greater than 0.060 inches, due to the fact that excess load was imposed upon the motor thereby causing motor failure. However, in accordance with the present invention it has been found that it is possible to use filaments of the type described herein with a diameter described herein due to the unique construction of the rotary cutting device. The bobbin sleeve is designed to serve as the source of the filament 68 which ultimately serves as the cutting element. Moreover, the mechanism associated with this bobbin sleeve 58 permits dispensing of the filament 68 as desired, in a manner to be hereinafter described in more detail.

The lower end of the drive shaft 46 extending from motor 40 carries a commutator 102 cooperating with brushes 103, the latter of which are secured to the interior surface of the side wall 12 near its lower end. The drive shaft 46 is provided with a rotary driven hub 106 the latter of which is again retained within a hub casing 108. Again, the hub 106 and the casing 108 serve as a lower bearing in the same manner as and have essentially the same construction as the hub 50 and tapered aperture 56.

By reference to FIG. 2, it can be observed that the housing 12 is provided at its lower end with a bottom wall section 110, having a bottom plate 112. Integral with the bottom plate 112 in a conventional construction is the hub casing 108. It can also be observed that the bottom plate 112 is provided with a plurality of apertures 113 in order to permit the cooling air which has passed over the motor 40 to be exhausted from the housing 10. It can also be observed that the hub casing 108 is provided with an aperture formed by a tapered side wall 114 in order to accommodate a mating tapered end of the hub 106. Again, this tapered side wall 118 forms part of a spherical surface. By further reference to FIG. 2, it can be observed that the lower hub 106 rotates with the drive shaft 46 inasmuch as it is secured to the driveshaft 46. In this way the hub 106 also serves as a bearing for the drive shaft 46.

The drive shaft 46 extends downwardly through the hub 106 in the manner as illustrated in FIG. 2 of the drawings. Secured to the lower end of the drive shaft 46 and extending downwardly therefrom is a guide disc split drive 116 and rotatably carried therewith is a filament guide disc 118. The guide disc 118 is provided with a horizontal plate 120, having an upstanding cylindrically shaped bars 122. The disc drive ring 116 is actually a so-called "split ring" which tightly frictionally engages the bars 122, which, in turn, engages the guide disc drive ring 116. Moreover, the filament guide disc 118 is provided with an annular upstanding flange 92, which is disposed beneath and spaced from the bottom wall 112 of the housing 10. The plate 120 is provided with an enlarged section 124 having an annular recess 126 formed therein for receiving a liquid or a suitable solid material serving as a balancing element 128 and by which means the material in the recess 126 will serve as an automatic balance for the device A. Any suitable liquid such as water or the like may be employed. Also any solid material which is preferably a semi-solid material with a viscosity to enable some movement thereof, e.g. gels or the like, may also be employed. Moreover, a suitable cover 130 may be disposed over the recess 126 in order to retain the balancing element 128, particularly if the latter is a liquid.

Integrally formed with the top plate 72 is an upstanding cylindrically shaped cable locking ring 132, having a plurality of upwardly projected fingers 134 separated by recesses 136 in order to accommodate the filament 68. In addition, a nipple 138 is inserted in the open upper end of the interior bore 48, in the manner as illustrated in FIG. 5, and which serves as a guide for the filament 68 to pass into and through the tubular bore 48 of the drive shaft 46. These fingers 134 serve as a type of locking device in order to lock the filament 68 against unauthorized withdrawal from the coil 66 in a manner to be hereinafter described in more detail.

By further reference to FIG. 5, it can be observed that the bottom wall 62 and the vertically disposed wall 76, forming a part of the bobbin 58 is provided with a recess 140 to accommodate a compression spring 142 and which bears at its lower end against a retaining plate 144, the latter of which is located at the upper end of the hub 50. In this way, the entire bobbin sleeve 58 can be vertically shifted with respect to the hub casing 52 and with respect to the main drive shaft 46, in a manner to be hereinafter described in more detail.

Mounted within the top wall 16 is a pushbutton release switch 145 which includes an enlarged head 146 and a cylindrically shaped vertically disposed shaft 148 which merges at its lower end into a horizontally disposed actuating plate 150. By reference to FIG. 5 of the drawings, it can be observed that the actuating plate 150 is located and sized so as to engage the upper margin of the side wall 60 forming a part of the bobbin sleeve 58.

In this way, when the bushbutton switch 145 is depressed, the bobbin sleeve 58 will shift downwardly in order to dispense the coil 68 in a manner to be hereinafter described in more detail. The pushbutton switch 145 is normally biased upwardly by means of a compression spring 152 which is interposed between the lower surface of the head 146 and the top wall 16, in the manner also illustrated in FIG. 5 of the drawings.

Referring again to FIG. 2 and FIG. 4, it can be observed that the lower end of the filament 70 is angularly struck with respect to that portion of the filament extending through the central bore 48 of the drive shaft 46. Moreover, this lower end extends through an aperture 154 located in the outer portion of the filament guide 118. In this case, the aperture can also adopt the form of a notch. In any event, the lower end 70 is rotated with the filament guide 118 inasmuch as the guide 118 is rotated with the drive shaft 46. The lower end 70 which serves as the cutting element, is shown as extending beyond the skirt 20. However, it should also be understood in accordance with conventional construction that the lower end could be terminated inwardly of the skirt 20 as a safety measure if desired.

Referring again to FIG. 2, it can be observed that the lower edge of the skirt 20 is provided with a vertically disposed wall 156 having an annular groove 158 formed therein. This groove 158 is provided for purposes of mounting an edging guard and a wheel carriage (not shown). In this way the entire device A could be conveniently mounted on a wheel carriage for convenient movement thereof. Moreover, an edging guard may also be located to extend circumferentially beyond the entire skirt 20. This groove 158 also provides a means of attaching an additional cutting element, if desired. This additional cutting element may function as an edge trimmer and may also operate in conjunction with the rotating lower end 70 of the cable 68 so as to provide both edge trimming simultaneously with other vegetation cutting. The groove may also be used to receive an accessory carriage so that the device may assume the attitude of a lawn mower whereby trimming or mowing may be accomplished at a convenient preselected height.

One of the unique aspects of the present invention is that device A includes the bobbin assembly which provides a source of the filament when the lower end 70 is worn or torn. In this respect, it can be observed that when the motor 40 is energized, the bobbin assembly 58 along with the entire drive shaft 46 and the lower end 70 of the filament, which serves as a cutting element, are rotated simultaneously. When the lower end 70 is worn or when it is otherwise desired to dispense further filament, the operator of the device will cease operation, typically by de-energizing the motor 40. For this purpose, a suitable switch (not shown) could be provided on the housing exterior.

After the motor 40 is de-energized, the operator merely pushes down on the pushbutton release switch 145 so that the plate 150 engages the upper edge of the side wall 60 forming part of the bobbin sleeve 58. The pushbutton release switch 145 is moved downwardly against the action of the spring 152. As the shaft 148 shifts downwardly, the plate 152 will push the entire bobbin sleeve 58 downwardly. As this occurs, the filament will be released from a locking action in the grooves 136 between the upstanding fingers 134. As the bobbin assembly 58 is moved downwardly, the nipple 138 affixed to the drive shaft 46 will not be vertically displaced. This action results in the filament being lifted clear of the locking grooves 136 between the fingers 134. In this way, further filament may be removed from the coil permitting withdrawal through the central bore 48 of the drive shaft 46 by pulling on the lower end portion 70.

After a sufficient amount of the filament has been withdrawn, the operator merely releases the pushbutton release switch 146 which thereupon permits the entire bobbin sleeve assembly 58 to be shifted upwardly my means of the compression spring 142. In this way, the filament will thereupon become locked in a groove 136 between two adjacent fingers 134.

The balancing element 128 located in the recess 126 also serves a unique function in order to compensate for both axial and radial displacement. Liquid or semi-liquid substances in the recess serves to aid both in the static and dynamic balancing of the skirt 20 and hence the entire device A. It has been found that the cutting portion of the filament may be between 1.5 inches to about 6 inches. The length of the cutting portion is a function of the filament diameter as is the peripheral speed of the cord. Generally, the larger the filament diameter, the slower may be the speed, while the larger the filament, the longer can be its cutting portion.

Thus, there has been illustrated and described a unique and novel rotary cutting device, primarily useful in the cutting of vegetation and which fulfills all of the objects and advantages sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described my invention, what I desire to claim and secure by letters patent is:

1. A rotary cutting apparatus for cutting vegitation with a filament comprising:
   a housing;
   motive means mounted within said housing for rotatably moving the filament, said motive means including a hollow shaft having first and second ends, said shaft receiving the filament through said hollow portion thereof;
   a guide disc connected to said first end of said shaft for directing the filament from a generally vertical disposition to a generally horizontal dispostion whereby a cutting portion of the filament is formed;
   a bobbin assembly mounted within said housing and connected to said second end of said shaft, said assembly including a filament spool portion for storing a coil of filament and an upper integral locking portion for restraining the filament, the filament passing from said spool portion upwardly to said locking portion and then downwardly through said hollow shaft, said assembly being spring mounted and movable vertically between locking and unlocking positions; and
   pushbutton means mounted to said housing for moving said bobbin assembly vertically between said locking and unlocking positions whereby upon depression of said pushbutton an operator may manually pull out a desired amount of filament to form a cutting portion and upon release of said pushbutton said filament is restrained in position.

2. An apparatus as claimed in claim 1 wherein said pushbutton means includes an extended head portion disposed above said housing, an integral cylindrical neck shaft portion, an integral actuating plate portion disposed within said housing for bearing upon said bobbin assembly, and a spring located about said shaft portion for biasing said head portion upwardly.

3. An apparatus as claimed in claim 2 wherein said plate portion is disposed above said locking portion of said bobbin assembly when said bobbin assembly is in said locking position and in engagement with said locking portion when said bobbin assembly is in said unlocking position.

4. An apparatus as claimed in claim 1 wherein said bobbin assembly includes an upstanding cylindrical ring having an irregular upper surface of alternating fingers and recesses, said recesses for receiving said filament, and top and bottom walls forming said spool portion, the filament passing around said top wall and around the upper surface of said ring at a recess when said bobbin assembly is in its locking position.

5. An apparatus as claimed in claim 4 including a vertically fixed nipple connected to the second end of said hollow shaft for receiving and directing said filament after said filament passes said ring.

6. An apparatus as claimed in claim 1 wherein said guide disc includes an annular recess for receiving a movable weighted material for balancing said disc.

7. The rotary cutting apparatus of claim 1 further characterized in that said bobbin assembly is operatively connected to said motive means and is rotatable therewith, said bobbin assembly being rotatable by said motive means and axially shiftable with respect thereto.

8. The rotary cutting apparatus of claim 1 further characterized in that said guide disc is located in close proximity to a lower portion of said housing, and the filament having a lower portion which serves as a cutting member and is guided in its rotational movement by said guide disc.

9. The rotary cutting apparatus of claim 8 further characterized in that said guide disc is operatively connected to said motive means and is rotatable thereby.

* * * * *